March 11, 1952  F. W. OPP ET AL  2,588,561
APPARATUS FOR ELECTRICALLY TREATING THE SOIL
Filed Aug. 29, 1949
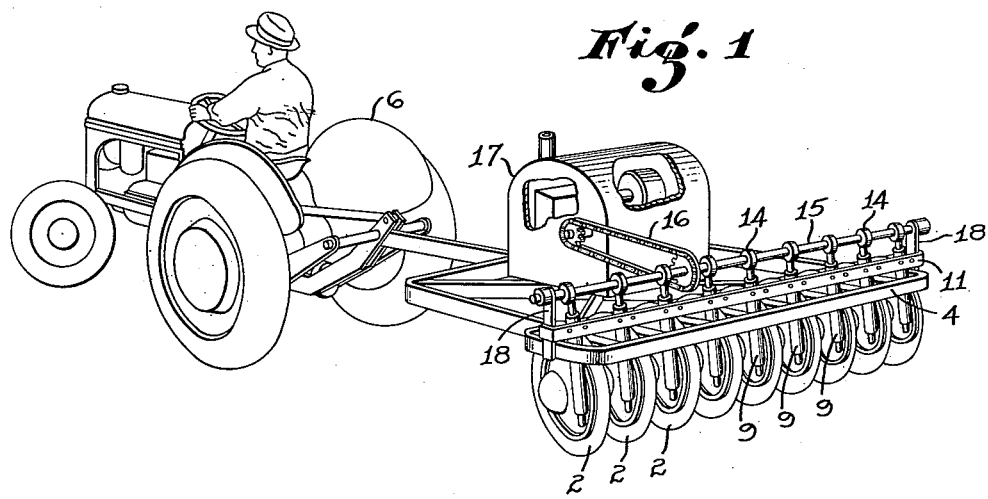
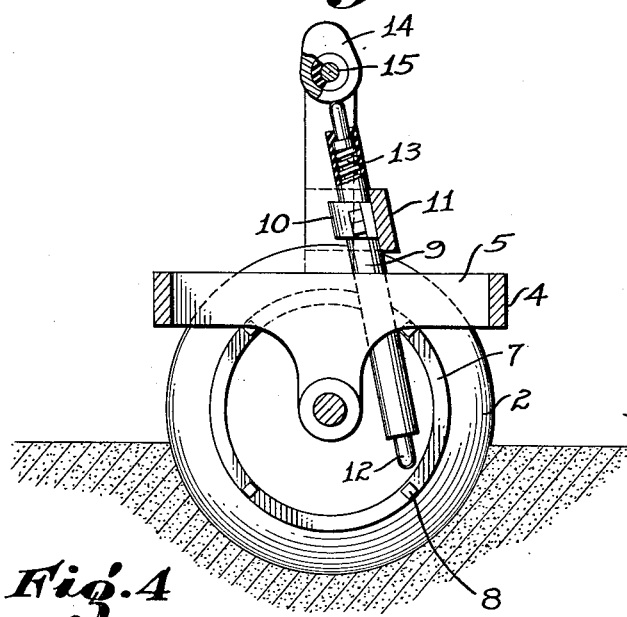
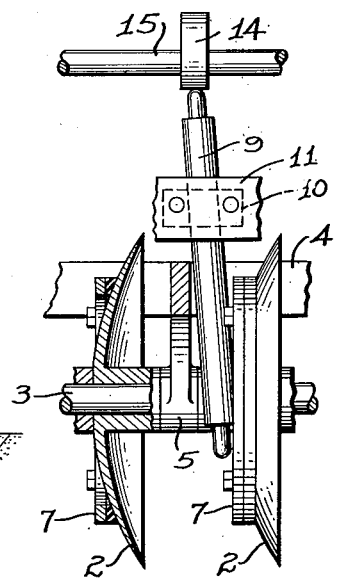
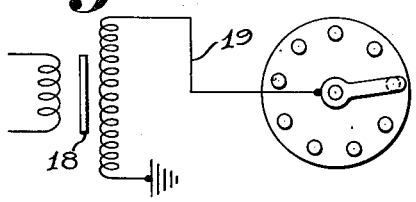
INVENTOR.
FRED W. OPP
WALTER H. OPP
BY Lyon & Lyon
ATTORNEYS.

Patented Mar. 11, 1952

2,588,561

UNITED STATES PATENT OFFICE 2,588,561

APPARATUS FOR ELECTRICALLY TREATING THE SOIL

Fred W. Opp, Costa Mesa, and Walter H. Opp, Altadena, Calif.

Application August 29, 1949, Serial No. 113,003

3 Claims. (Cl. 47—1.3)

This invention relates to an apparatus for treating soil by subjecting the soil to the action of an electric current or arc, by subjecting soil to electric currents and arc discharge tubes to kill weeds, destroy bacteria, fungi and other elements present in the soil which are harmful to the growth of plants, to introduce minerals and render more available to plants the minerals already in the soil, and to stimulate the growth of plants.

It has been found that by subjecting soil to arc treatment one may increase the solubility of the minerals present in the water in the soil and thereby facilitate plants acquiring minerals from the treated soil.

Previous to the present invention the practical art, in subjecting soil to arc treatment or to the treatment of electric currents, has caused the flow of current or an arcing from electrodes to be drawn over the ground or spaced slightly from the ground. In accordance with the present invention it has been found that a superior treatment of the soil can be effected by the utilization of electrodes disposed below the surface of the ground so that arcing occurs beneath the soil rather than on the surface of the soil. Accordingly, in the apparatus of the present invention means are provided for creating such arcing below the surface of the soil. For this purpose in the present invention specially constructed cultivator blades are employed as the electrodes so that when such cultivator blades are drawn over the soil in the usual manner by burying themselves within the soil and turning the soil over they may induce the desired below-the-surface arcing. There is also provided an intermediate movable electrode which is intermittently projectionable below the ground to make and break contact with the cultivator formed electrode thereby producing the desired under-soil arcing.

The apparatus of the present invention will be apparent from the following description of the preferred form of the invention, which description is given in connection with the accompanying drawings, in which Figure 1 is a perspective view of an apparatus embodying the invention;

Figure 2 is an enlarged elevation mainly in vertical section;

Figure 3 is a fragmentary elevation at right angles to Figure 2, partially in section;

Figure 4 is an electrical diagram.

Referring to the drawings the apparatus of the present invention comprises a plurality of cultivator blades 2, which may be of any usual or preferred shape. These blades are mounted upon an axle 3 carried by the frame 4. Spacers 5 may be provided on the frame for spacing successive cultivator blades. The frame 4 may be constructed so that it is adapted to be drawn by a tractor such as indicated at 6 over the ground to be treated by the apparatus of the present invention.

Preferably each of the cultivator disks 2 is provided with a removable metal electrode ring 7. These electrodes 7, which are attached to or a part of the cultivator blades 2, are made separate from the body of the cultivator for the reason that to some extent they become consumed in the use of the apparatus by the arcing treatment, and also because it may, in certain cases, be desirable that these electrodes be formed of different metals than the material of the body of the cultivator blades 2. The material out of which these electrodes are constructed will be introduced into the soil in a provisional manner. Thus, for example, by utilizing electrodes 7 of such metal as iron, magnesium, arsenic, copper, manganese and silver it is possible to introduce these metals or compounds thereof into the soil by the process of the present invention. Certain of these metals listed are useful for killing or destroying certain bacteria or fungi present in the soil but may be harmful to plant growth if present in excessive quantities.

The ring electrode 7 may be attached to the cultivator disk in any desired manner such as by the use of bolts 8.

There is also provided corresponding to each cultivator blade 2 an insulating tube 9 carried by a bracket 10 attached to a cross-frame member 11. Within each insulated tube 9 there is provided a plunger electrode 12 which is movable axially of the insulating tube 9 into and out of contact with the ring 7. A coil spring 13 yieldingly urges the plunger electrode 12 into its upper position where it is disengaged with the ring 7. The upper end of each plunger electrode 12 is engaged by a cam 14. The electrode 12 may, if desired, be provided with removable tips. A series of cams 14 are mounted upon the shaft 15, which shaft 15 is continuously driven by suitable means, such for example as the drive chain 16 leading from any desirable motor, not shown. In operation of the apparatus of the present invention the different individual cams 14 are so set as to cause advancements of their plungers 12 in succession so that each succeeding electrode 12 makes contact with its corresponding ring electrode 7 in succession, whereupon the cycle is repeated. The point at which the electrodes 12 strike the ring electrodes 7 is selected so as to preferably lie intermediate the depth of the furrow turned over by the cultivator blade 9.

Upon the frame 4 of the apparatus within a suitable housing such as indicated at 17, is a generator set for generating a source of voltage and current for the apparatus of the present invention. Such an apparatus for generating electric potential is diagrammatically indicated at 18 in Figure 5 and one side of the voltage, normally the negative side, is ground to the frame 4 of the apparatus and thereby connected with the ring electrodes 7. The other side, indicated at 19, is connected to the shaft 15 which is insulated from the frame by insulating supports 18.

In use of the apparatus of the present invention the apparatus is drawn by a tractor or other suitable means over the surface to be treated while the shaft 15 is continuously rotated and electric potentials applied to the electrodes 12 and 7. The electrodes 12 and 7 of each different cultivator disk make and break contact in succession during this process with the result that an arc discharge is created under the soil. This discharge occurs in the following part of the cultivator disk, that is after the truck has broken and turned back the soil.

By the apparatus of the present invention almost all processes or arc and current treatment of soil may be improved. These improvements may be attained, for example, where the purpose of the treatment is primarily for weed killing, or where the purpose is primarily for the destruction of bacteria and fungi. The apparatus of the present invention is also particularly useful for introducing different metals into the soil, in which case ring electrode 7 is made of the metal to be introduced. The apparatus of the present invention is used for treating soil both through the use of low voltage high current treatments and in certain cases through the use of high voltage low current treatments.

While the particular form of the apparatus herein described and claimed is well adapted to carry out the objects of the invention various modifications and changes may be made and this invention is of the scope set forth in the appended claims.

We claim:

1. An apparatus for treating soil in situ which comprises a cultivator disk, a movable electrode intermittently movable into contact with the cultivator disks, means for so intermittently moving said electrode, and a source of electric potential connected to said electrode and cultivator disk whereby to develop an arc discharge between the electrode and the disk on each successive intermittent motion of said electrode.

2. An apparatus for treating soil in situ which comprises a frame, a plurality of cultivator disks carried by the frame, a movable electrode for each cultivator disk, means for moving said electrodes intermittently into contact with said cultivator disk, means for generating a potential between said electrode and cultivator disks for effecting an arc discharge therebetween, the cultivator disks having removable ring-shaped electrodes where said cultivator disks are contacted by said movable electrodes.

3. An apparatus for treating soil in situ which comprises a frame, a shaft mounting, a plurality of cultivator blades supported by said frame, a rotating shaft supported by said frame and carrying cams, plungers movable into contact with said cultivator blades intermittently operated by said cams, means for driving said cams, and means for generating an electric potential between said plungers and cultivator blades.

FRED W. OPP.
WALTER H. OPP.

REFERENCES CITED

The following references are of record in the file of this patent:

UNITED STATES PATENTS

| Number | Name | Date |
|---|---|---|
| 2,243,891 | Topel et al. | June 3, 1941 |